United States Patent [19]

Titus

[11] 4,366,741

[45] Jan. 4, 1983

[54] METHOD AND APPARATUS FOR DISPLAYING MUSICAL NOTATIONS

[75] Inventor: John S. Titus, Prior Lake, Minn.

[73] Assignee: Musitronic, Inc., Owatonna, Minn.

[21] Appl. No.: 185,324

[22] Filed: Sep. 8, 1980

[51] Int. Cl.³ .......................................... G09B 15/08
[52] U.S. Cl. ...................................... 84/478; 84/484; 248/279
[58] Field of Search ....................... 84/1.01, 1.18, 329, 84/453, 470 R, 471 R, 477 R, 478, 479 R, 479 A, 484; 248/278, 279, 476, 479, 480, 487

[56] References Cited

U.S. PATENT DOCUMENTS

| | | | |
|---|---|---|---|
| 2,547,535 | 4/1951 | Pierce et al. | 84/478 |
| 3,091,152 | 5/1963 | Bridges | 84/478 |
| 3,153,365 | 10/1964 | Redmond | 84/478 |
| 3,155,000 | 11/1964 | Gnatt | 84/478 |
| 3,180,201 | 4/1965 | Low, Jr. et al. | 84/477 R |
| 3,395,461 | 8/1968 | Krause | 84/478 |
| 3,429,216 | 2/1969 | Lawrence | 84/471 R |
| 3,429,217 | 2/1969 | Lawrence | 84/471 R |
| 3,446,109 | 5/1969 | Scott et al. | 84/478 |
| 3,460,426 | 8/1969 | Jensen | 84/478 |
| 3,501,850 | 3/1970 | Ouchterlony | 84/478 |
| 3,570,360 | 3/1971 | Siegel | 84/477 R |
| 3,652,776 | 3/1972 | Milde, Jr. | 84/1.18 X |
| 3,695,138 | 10/1972 | Andersen | 84/470 R |
| 3,710,671 | 1/1973 | Reid, Sr. et al. | 84/477 R |
| 3,744,368 | 7/1973 | Lady | 84/470 R |
| 3,823,637 | 7/1974 | Scott | 84/470 R |
| 3,914,029 | 10/1975 | Hoplock | 248/487 X |
| 4,012,979 | 3/1977 | Wemekamp | 84/478 X |
| 4,024,789 | 5/1977 | Humphrey et al. | 84/477 R |
| 4,082,029 | 4/1978 | Rumer, Jr. et al. | 84/484 |
| 4,084,213 | 4/1978 | Kirchner et al. | 361/384 |
| 4,090,210 | 5/1978 | Wehling et al. | 248/278 X |
| 4,318,327 | 3/1982 | Toups | 84/477 R |

OTHER PUBLICATIONS

*Conn Teacher's Console* Brochure, Conn Corporation, Elkhart, Indiana.
*Conn Student Station* Brochure, Conn Corporation, Elkhart, Indiana.
*Conn Music Learning System* Brochure, Conn Corporation, Elkhart, Indiana.
*Wurlitzer Educational Products* Brochure, Wepco, Inc., 1700 Pleasant Street, DeKalb, Illinois.
*Wurlitzer Key/Note Visualizer Model 208* Brochure, Wurlitzer Educational Products, DeKalb, Illinois.
*Wurlitzer Mobile Music Learning System* Brochure, The Wurlitzer Company, DeKalb Division, DeKalb, Illinois.

*Primary Examiner*—Stanley J. Witkowski
*Attorney, Agent, or Firm*—Burd, Bartz & Gutenkauf

[57] ABSTRACT

An electronic piano has a keyboard and an electronic piano circuit connected to a micro-processor used to control a CRT device to provide a video note display concurrently with the depression of one or more keys. A keyboard representation located adjacent the screen of the CRT device is associated with lights used to indicate the key or keys that are played. Manually operated controls cooperate with the micro-processor to allow the back clearing of the screen one note at a time, remove all the notes, retain all the notes, indicate sharp or flat mode of each note, and indicate the duration that a key is depressed by elongating the note on the screen. A metronome unit is used with the micro-processor to provide a visual beat marker on the screen that sequentially moves across the screen. A movable frame connects the CRT device to the piano.

32 Claims, 22 Drawing Figures

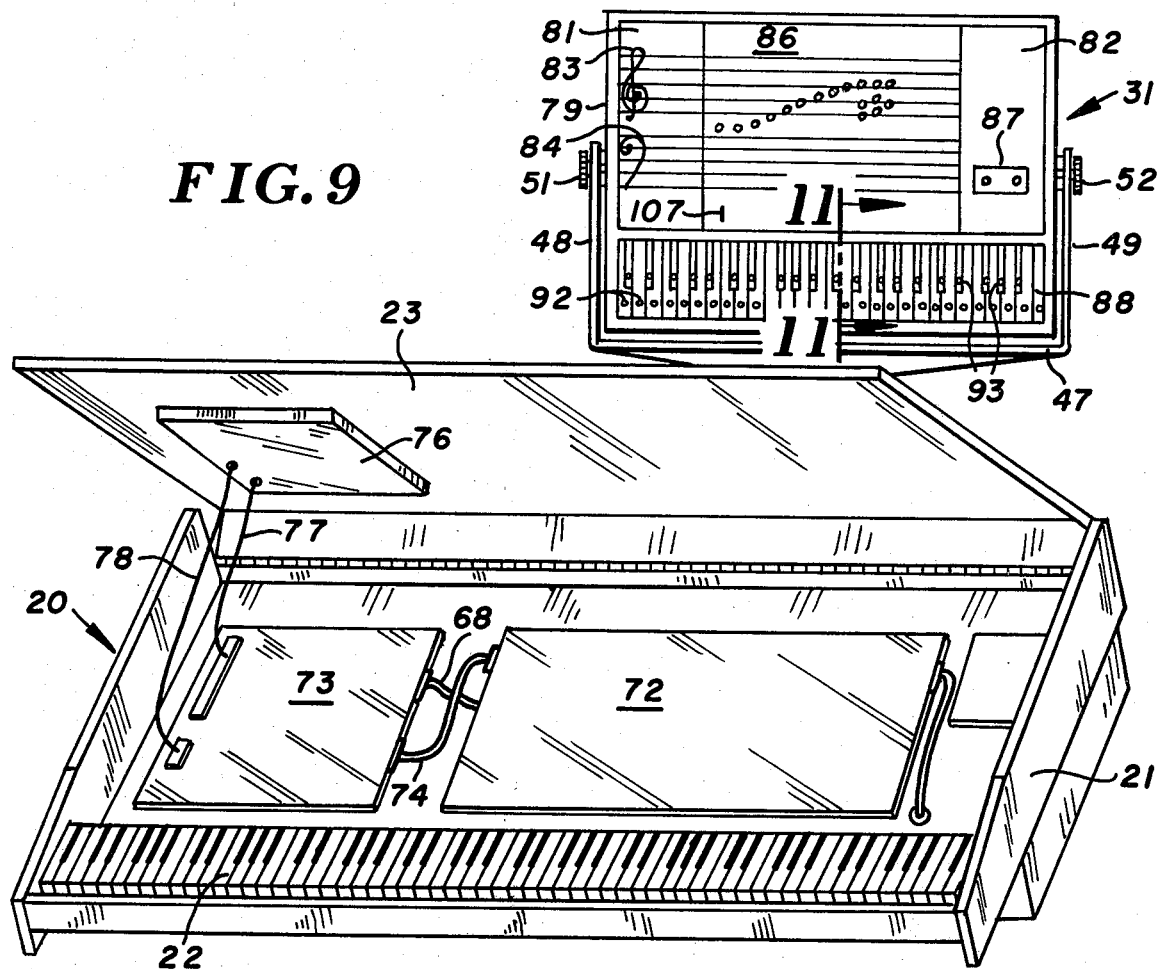
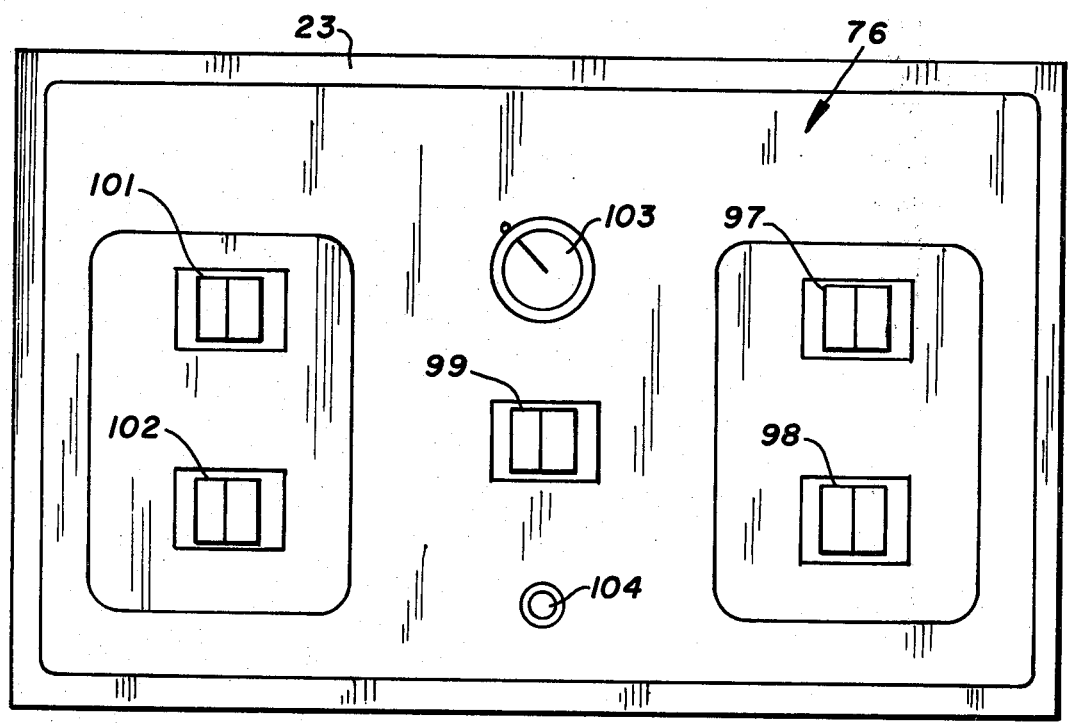
FIG. 9
FIG. 10

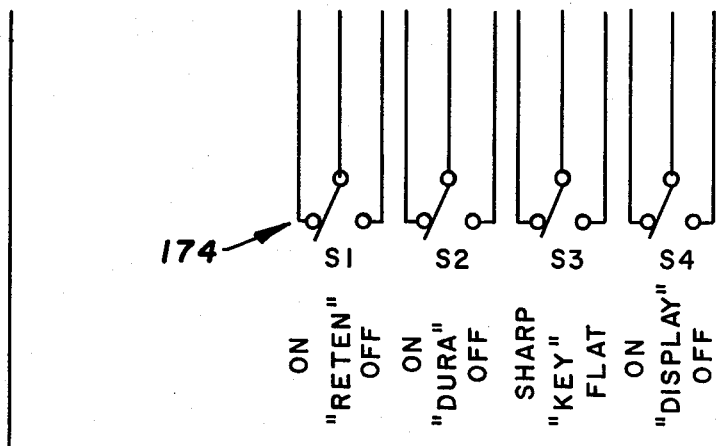
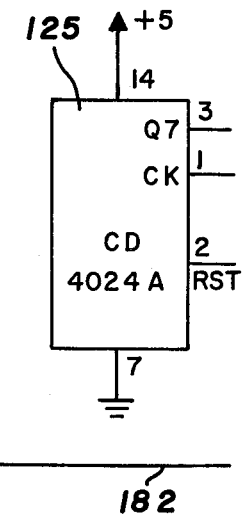
FIG.13e
| FIG.13a | FIG.13b | FIG.13c | FIG.13d |
|---|---|---|---|
| FIG.13e | FIG.13f | FIG.13g | FIG.13h |
FIG.13

METHOD AND APPARATUS FOR DISPLAYING MUSICAL NOTATIONS

SUMMARY OF INVENTION

The invention is a music learning method and apparatus that provides an instant audio-visual display of music notation melodically, harmonically and rhythmically as it is played on an electronic piano. As the keys are depressed on the piano keyboard, large notes appear on a video screen providing an instant audio-visual display of music notation. The note on the screen is a visual representation of music as it appears on a printed music score. Associated with the video display is a keyboard pattern display or representation, which includes a light that visually indicates the key or keys played. Each key on the keyboard pattern has a light which is on when the piano key associated with the key of the keyboard pattern is depressed.

The video learning system visually presents instantly the actual relationship between the keyboard and staff that a student would have while reading music. It enables the students to learn by what they see and hear in an instantaneous fashion or in real time. A CRT unit displays notation on the grand staff and ranges from C below the base staff to C above the treble staff for up to 16 rhythmic increments. The rhythmic increments may be operated manually or automatically with a built-in metronome control. Sharp and flat symbols are indicated within the body of the note symbol on the screen of the CRT unit. A rhythm increment marker is also displayed on the screen below the grand staff.

In the basic mode of operation, the notes will appear and remain on the CRT screen until all of the 16 increments are used. The CRT screen will automatically clear and start a new display after the 16 increments are used. A reset control allows the student to back clear a note at a time or remove all the notes from the CRT screen. A retention mode makes it possible to play a line of notation across the screen and repeat with a second line overlaying additional notation. A duration mode is also incorporated in the circuit to provide visual information as to the time value of a note by elongating the note symbol proportional to the length of time the tone is held.

The apparatus and method for providing visual information instantly with the playing of one or more keys of an electronic piano has visual display means for displaying one or more notes corresponding to one or more keys that are played or depressed by the piano student. The electronic piano produces audio information or sound concurrently with the music notation on the display means. Signal processing means operatively coupled to the piano circuit and visual display means controls the display of music notation on the display means. The signal processing means includes manually operated control means which control the functions of the processing means to reset, retain, change rhythmic increments, or provide note duration information.

The visual display means includes a first visual note display means or CRT display having a screen which shows the notes being played in actual relationship with a staff as they appear on a printed music score. The visual display means has a second visual note display means in the form of a pictoral representation of the keyboard 22 of electronic piano 20. The keyboard representation is located below the CRT display. Each key of the keyboard representation is associated with a light. The lights of the keys are electrically connected to the signal processing means so that, when a piano key is depressed, the light associated with the key is on, thereby providing visual information of the played key. The note corresponding to the key will be displayed on the CRT display.

The visual display means is mounted on a frame or stand movably associated with the electronic piano so that the piano and visual display means can be moved to a selected location and from room to room. The frame has upright post means supported for movement on a supporting surface. An arm means pivotally connected to the piano holds the post means in a generally upright position. The arm means allows the visual display means to be moved to change the location of the visual display means relative to the piano keyboard. A pivot assembly associated with the post means and means for carrying the visual display means allows the visual display means to be rotated about a generally upright axis to change the viewing field of the visual display means.

IN THE DRAWINGS:

FIG. 9 is a diagrammatic perspective view of the keyboard section of the electronic piano and front of the video note display unit;

FIG. 10 is an enlarged plan view of the video control panel;

Figure 1:
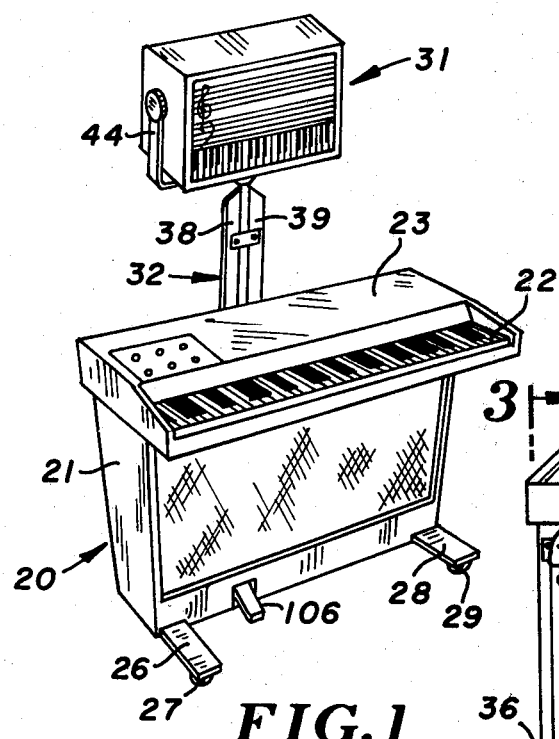
FIG. 1 is a perspective view of an electronic piano operatively connected to a video note display unit of the invention.

DESCRIPTION OF PREFERRED EMBODIMENTS:

Referring to FIG. 1, there is shown an electronic keyboard instrument indicated generally at 20, commonly known as an electronic piano. Piano 20 has a housing or casing 21 supporting a keyboard 22 having conventional piano keys. The keyboard has 44 keys having a note range of F21 to C64. A top cover 23 extended rearwardly from keyboard 22 closes the chamber accommodating the electrical components of the piano. Housing 21 has a generally upright back wall 24 covering the back of the piano. Piano 20 is mounted on a pair of horizontal arms or supports 26 and 28. Caster wheels and rollers 27 and 29 associated with supports 26 and 28, respectively, movably support a piano on a floor 30.

Figure 2:
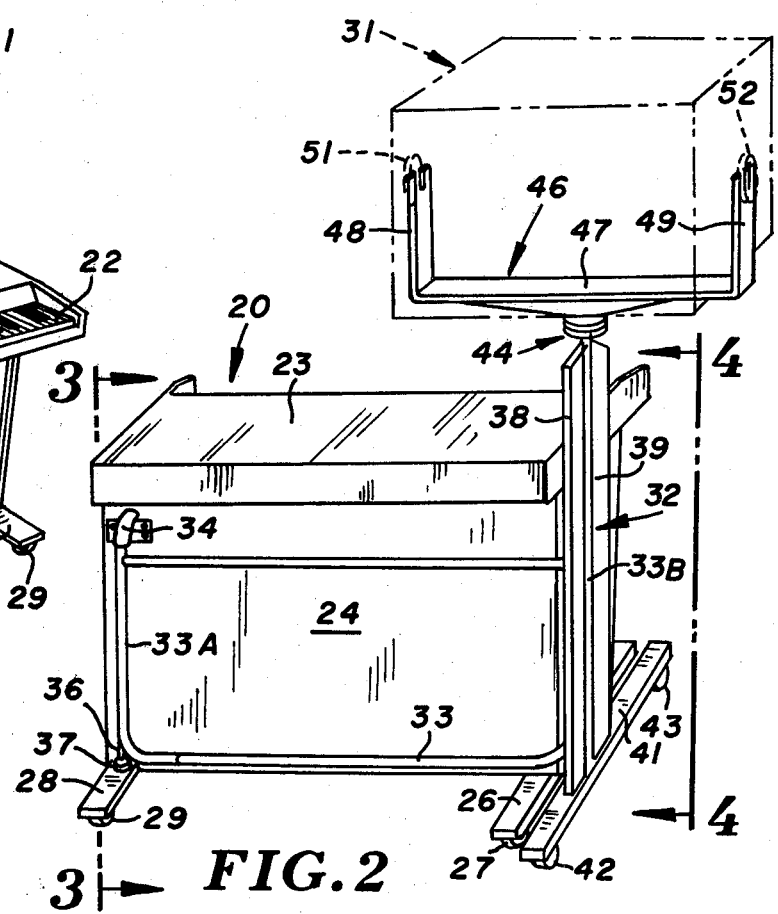
FIG. 2 is a rear elevational view of the electronic piano of FIG. 1 and the stand for the video display unit.
Figure 5:
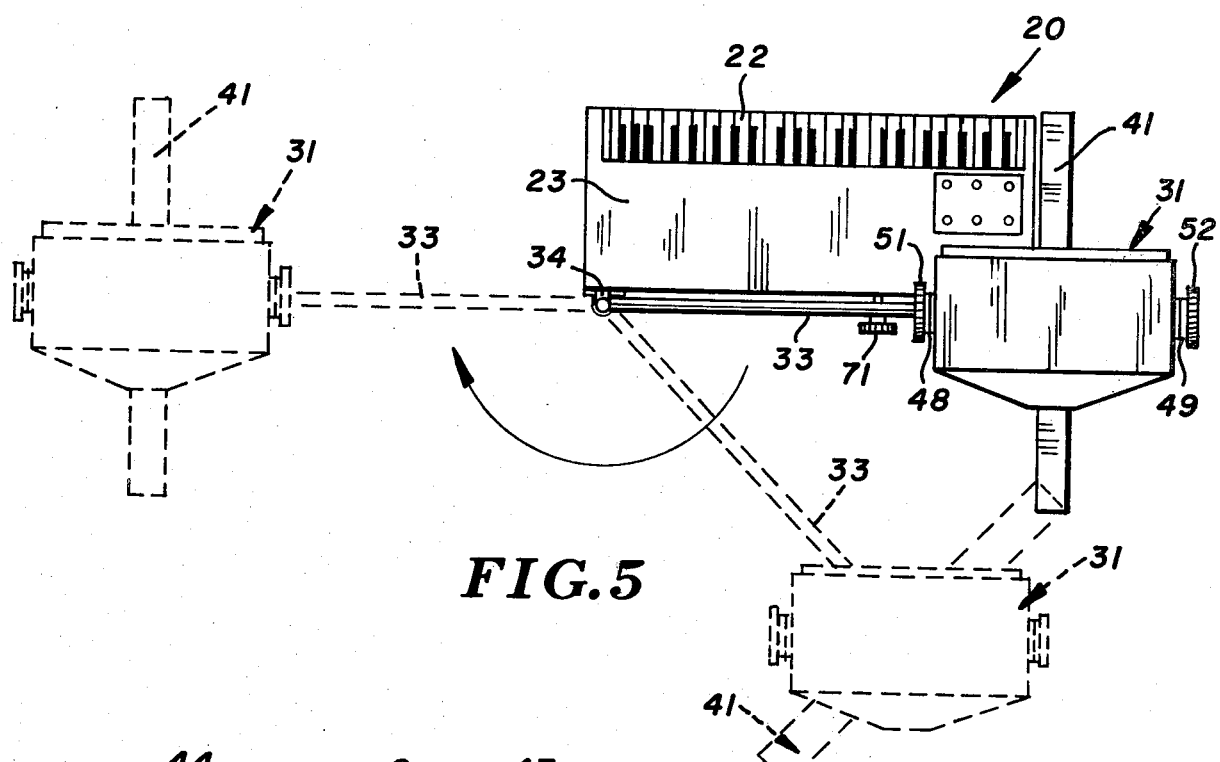
FIG. 5 is a top plan view of FIG. 2.

A video note display unit indicated generally at 31 is operatively connected to housing 21 with a movable stand indicated generally at 32. As shown in FIG. 2, stand 32 has a U-shaped frame 33 having a first upright leg 33A extended into a tubular bracket 34 secured to housing back 24. A downwardly directed horizontal leg 36 is joined to the lower end of arm 33A. The leg 36 cooperates with a bearing 37 mounted on top of support 28 to pivotally mount frame 33 on support 28 for movement about a vertical axis. Frame 33 has a second upright leg 33B located between a pair of upright plates 38 and 39. Plates 38 and 39 are secured to opposite sides of leg 33B and form therewith an upright post. The lower ends of plates 38 and 39 are attached to a horizontal support 41. A pair of wheels or rollers 41 and 42 attached to opposite ends of supports 41 engage floor 30 thereby providing a vertical movable base for the post. Frame 33 pivots about the upright axis of leg 33A rotatably mounted on bracket 34 and bearing 37. As shown in FIG. 5, frame 33 is arcuately movable 180 degrees from adjacent the back of piano 20 to adjacent the right side of piano 20. A lock bolt 71 extended through frame 33 and threaded into piano back 24 holds the frame adjacent back 24. Lock bolt 71 can be released from back 24 so that frame 33 and video unit 31 can be moved, as shown in broken lines relative to piano 20 to change the viewing location of video note display unit 31.

Figure 3:
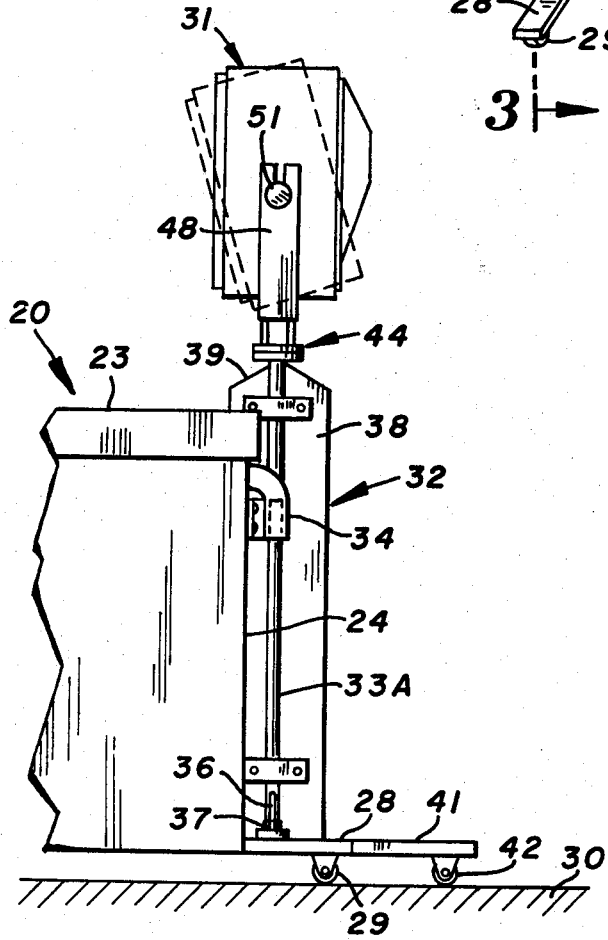
FIG. 3 is an enlarged side view of FIG. 2 taken along the line 3—3, as viewed in the direction of the arrows.
Figure 4:
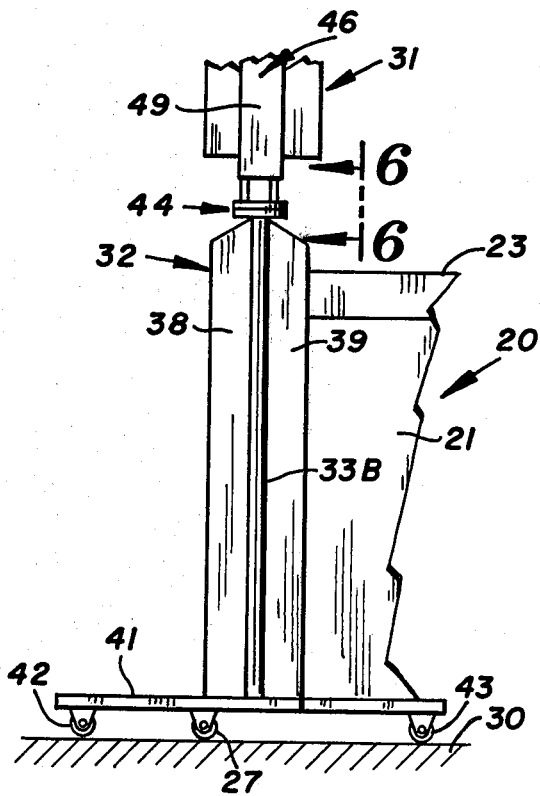
FIG. 4 is an enlarged side view of FIG. 2 taken along the line 4—4, as viewed in the direction of the arrows.
Figures 6, 7, 8:
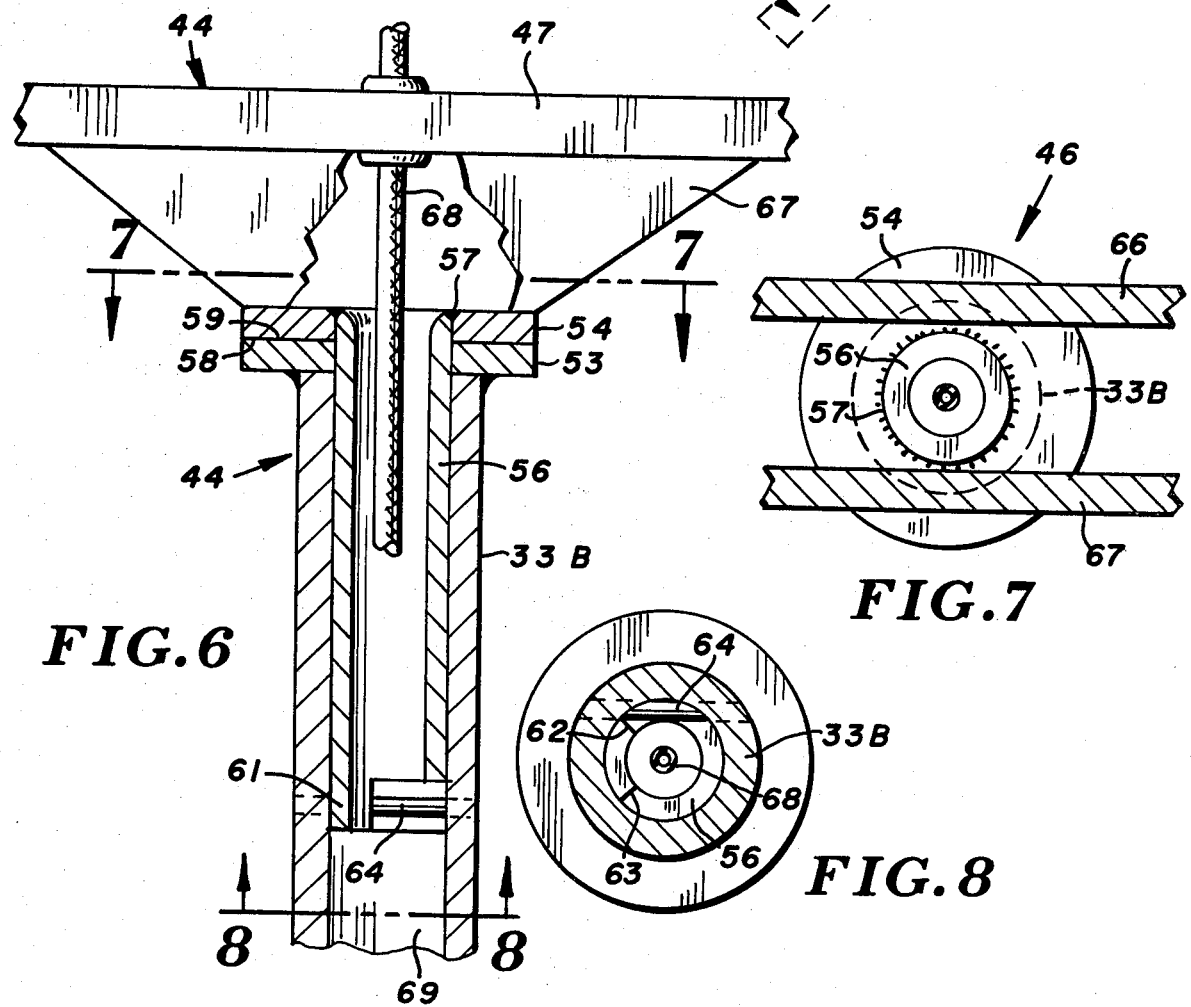
FIG. 6 is an enlarged elevational view, partly sectioned, taken along the line 6—6 of FIG. 4 looking in the direction of the arrows.
FIG. 7 is an enlarged sectional view taken along the line 7—7 of FIG. 6.
FIG. 8 is an enlarged sectional view taken along the line 8—8 of FIG. 6.

As shown in FIGS. 3, 4, and 6, a pivot assembly or motion limiting means indicated generally at 44 supports the video note display unit 31 on top of the leg 33B of frame 33. A yoke or U-shaped frame indicated generally at 46 has a base 47 extended along the bottom of the video note display unit 31 and upright arms 48 and 49 adjacent opposite sides of the video note display unit 31. Bolts 51 and 52 having enlarged hand-operated turning knobs are secured to opposite sides of the video note display unit. Bolts 51 and 52 are adjustable and pivotally mount the video note display unit 31 on the upper ends of the arms 48 and 49. As shown in FIG. 3, the video note display unit 31 can be pivoted about a generally horizontal axis and retained in the pivoted position by tightening bolts 51 and 52 to hold unit 31 in a selected tilt position.

Pivot assembly 44, as shown in FIGS. 6, 7, and 8, has a first annular ring 53 secured to the top of leg 33B. A second annular ring 54 is located on top of ring 53. A tubular member or pipe 56 is secured by welds 57 to a ring 54. Pipe 56 extends down into the passage of leg 33B and is rotatably disposed in leg 33B for rotation about a generally upright axis. Rings 53 and 54 have engaging flat annular surfaces 58 and 59 which rotatably support video note display unit 31 on leg 33B.

The lower end of pipe 56 has a downwardly directed arcuate lip 61. As shown in FIG. 8, lip 61 has opposite ends 62 and 63 which provide stop edges selectively engageable with a pin 64. Pin 64 is mounted in leg 33B and extends across an edge of the passage of leg 63B. Ends 62 and 63 are arcuately spaced from each other and selectively engage the pin 64 to limit the rotation of pipe 56 to about 180 degrees. This limits rotation of video display unit 31 about an upright axis to 180 degrees. Video display unit 31 can be positioned to face the player of piano 20, as shown in FIGS. 1 and 5, or turned up to 180 degrees to face away from the player of piano 20.

As shown in FIGS. 6 and 7, a pair of support plates 66 and 67 are secured to the top of ring 54 and the bottom of the base 47 of yoke 44. Plates 66 and 67 are laterally spaced from each other to provide space for an electrical cord 68 leading from video note display unit 31 through the leg passage 69 to electronic piano 20. An electrical connector may be located in the space between plates 66 and 67 to electrically couple cable 68 to video note display unit 31.

As shown in FIG. 9, video note display unit 31 has a casing or box housing 79 having opposite sides pivotally connected with the bolts 51 and 52 to arms 48 and 49. The front of the casing 79 has front panels 81 and 82 on opposite sides of a screen of a cathode ray tube 86. Panel 81 has the treble clef notation 83 and base clef notation 84. Panel 82 supports a CRT unit control 87. Located below panels 81 and 82 and CRT unit 86 is a keyboard display indicated generally at 88. The keyboard display 88 has a representation or duplication of the keys of keyboard 22 of piano 20.

Figures 11, 12:
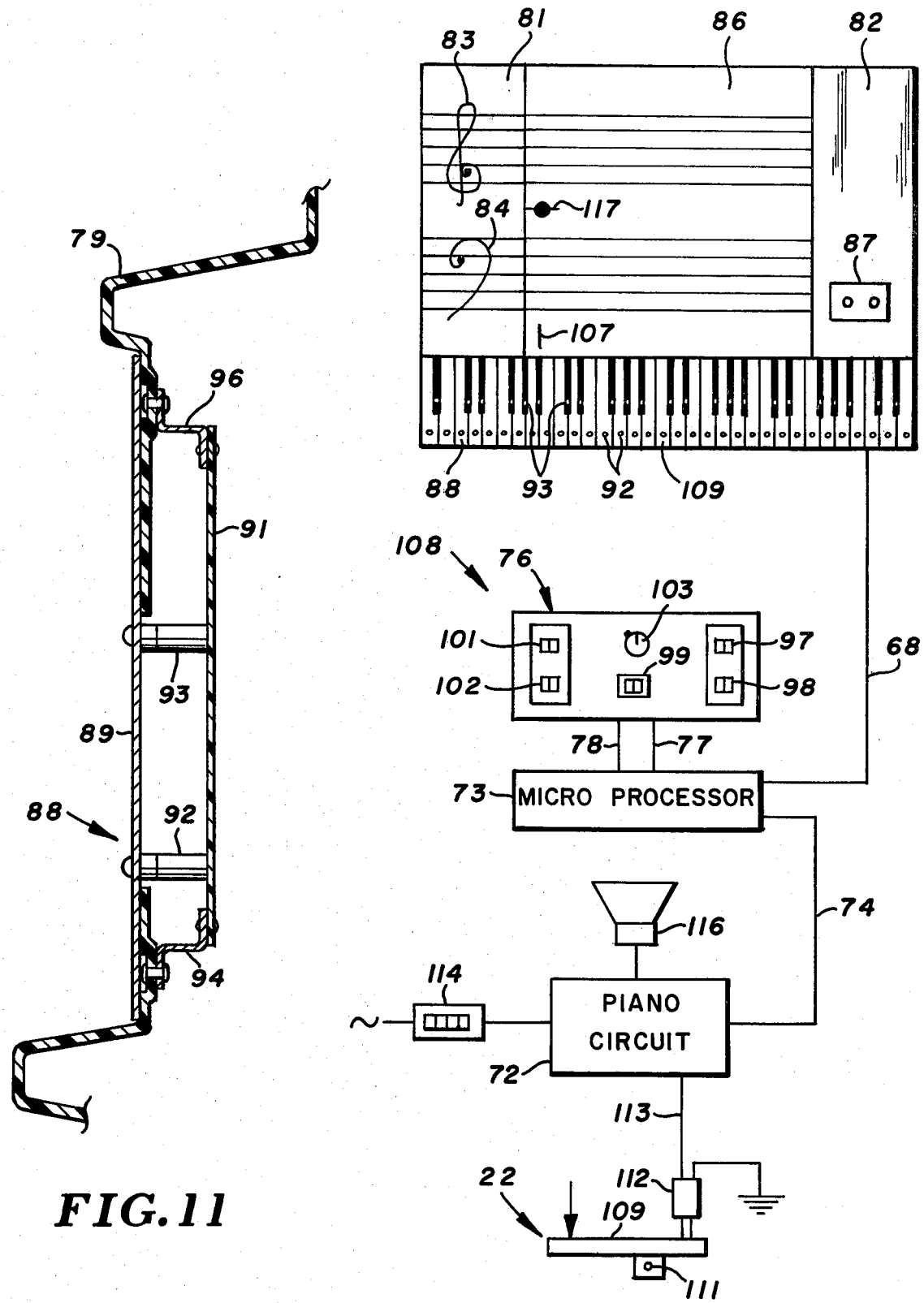
FIG. 11 is an enlarged sectional view taken along the line 11—11 of FIG. 9.
FIG. 12 is a block diagram of the electronic piano, micro-processor, and video control unit.

Referring to FIG. 11, keyboard display 88 has a transverse panel 89 carrying the keyboard representation. Panel 89 is secured to casing 79 in front of a circuit board 91. Circuit board 91 carries a plurality of incandescent lights 92 and 93. Lights 92 are aligned with or centered on each white key, as shown in FIG. 9. Lights 93 are aligned with or centered on each black key. Lights 92 and 93 can be light emitting diodes (LED). A pair of Z-shaped brackets 94 and 96 secure the circuit board 91 to casing 79.

Referring to FIG. 10, video control unit 76 mounted on cover 23 has a plurality of switches for controlling the operation of the video note display unit 31. Control unit 76 has a staff display switch 97 operable to activate the visual note display on CRT 86. Located below switch 97 is a keyboard display switch 98 operable to activate the key display lights 92 and 93 associated with keyboard display 88. Switches 97 and 98 are individually operated so that the staff, keyboard, or the combination of the staff and keyboard may be activated. A key signature switch 99 is operable to select either flat or sharp modes for any key. The flat or sharp symbols will appear within the note body on the CRT 86 when the flat or sharp key is played. Chromatic passages can be displayed by using the sharp mode for ascending passages and the flat mode for descending passages.

A retention mode switch 101 is operable to on and off positions. When switch 101 is in the on position, all symbols will be retained across CRT 86 allowing the player to play again and add notes to the symbols retained. For example, a player can initially play a melody which is retained in note form on the CRT 86. The melody notes are retained and additional cords are added to CRT 86. The process is repeated for a third time and base notes are added to the CRT 86. This process can be repeated as desired. When switch 101 is turned off, CRT 86 will clear.

A duration mode switch 102 is movable between on and off positions. When the switch is in the on position, the notes displayed on the CRT 86 are elongated proportional to the number of increments or duration the keys are held. This application may be used with metronome or manual selection. The durational mode provides a graphic illustration of the duration or rhythmic values.

A metronome control 103 is located in the center of the control unit 86. The metronome supplies automatic rhythm increments to the notes displayed on CRT 86. When metronome control 103 is in the off position, the note symbols on the CRT 86 will appear in increments as the keys are played. If additional spacing is desired, a foot pedal 106, as shown in FIG. 1, is used. As shown in FIG. 9, increment marker 107 moves horizontally along the bottom of CRT 86 in response to actuation of a key on keyboard 22 or automatically in accordance with time signals from the metronome. The metronome is used to provide the automatic rhythm. The metronome can be set at a desired speed. The rhythmic note increments will respond directly to each metronome beat. The increment marker 107 moves along the bottom of CRT 86 in response to the metronome beat. In metronome mode, the increment marker may be paused by depressing foot pedal 106.

Referring to FIGS. 9 and 12, there is shown a diagrammatic block diagram indicated generally at 108 of the electronic piano circuit 72, micro-processor 73, control 76, and video note display unit 31. Piano keyboard 22 has a plurality of black and white keys. One key 109 is shown connected to the electronic piano circuit 72. Key 109 pivoted on pivot member 111 actuates a switch 112. Line 113 connects switch 112 to piano circuit 72. The remaining keys are connected to a piano circuit in a similar manner. When key 109 is depressed, switch 112 is closed causing the crystal controlled tone generator means of circuit 72 to produce a tone or audio output corresponding to the note of the depressed key. Piano 20 has an audio amplification system and one or more audio output components or speakers 116 accommodating the output signals of the piano circuit 72.

Piano 20 is an electronic piano sold by Musitronic, Inc., Owatonna, Minnesota. The details of circuit 72 are not part of the present invention. Other electronic pianos can be used with the micro-processor and video note display unit of the invention to provide the music note signals to operate the video learning system. The note signals and audio information can be supplied from a tape which signals the micro-processor and provides audio information correlated to the notes displayed on the CRT 86. CRT 86 can be interfaced with a video tape unit which allows the note information being played and displayed on the CRT 86 to be stored and played back for subsequent viewing and review.

Referring now to FIGS. 13a–13h, when arranged as indicated in FIG. 13, they provide a schematic block diagram of the micro-processor based control logic used to effect overall control of the CRT display system and the light or LED keyboard display. A microprocessor suitable for use in implementing the system of the present invention may be the commercially available INTEL 8085A central processing unit (CPU) and its associated memories. However, since those skilled in the art will be able to discern from the instant teaching how alternative micro-processor modules may be adapted to the instant system, limitation to an INTEL 8085A based controller is not intended.

With that in mind, numeral 118 identifies the CPU controller chip. It cooperates with an associated read-only memory 119 which may comprise an EPROM integrated circuit chip which is coupled to the CPU 118 by way of an 8-bit address bus 120. An instruction bus 121 is also coupled between the CPU chip 118 and its associated EPROM chip 119. Hence, instructions stored in the EPROM chip 119 can be transferred into the CPU so that it can be made to function in accordance with a stored program of sequence of instructions. Also coupled to the address bus 120 and the control bus 121 is a random access memory or RAM chip 122. The EPROM 119 preferably comprises an INTEL Type 8755A integrated circuit and the RAM 122 may then be an INTEL Type 8155 IC chip. Both of these memory devices are compatible for use with the INTEL 8085A CPU chip. The RAM 122 device provides 256 bytes of random access memory for the CPU chip 118 and is equipped with three I/O ports, two being 8-bit ports and one a 6-bit port.

All of the logic functions performed by the microprocessor controller are either directly or indirectly controlled by the system clock contained within the CPU 118. In this regard, the clock frequency is derived from a crystal which may, for example, be made to oscillate at a 6.144 Mh rate, this crystal being coupled to the appropriate inputs of the CPU chip 118. Internal to the CPU chip 118, the crystal oscillator output is frequency divided by two such that a 3.072 Mh clock signal becomes available on line 124 in the control bus 121. Among other destinations, this block output signal is applied to the input labeled "CK" of a timer/counter chip 125. This device may typically be a CD 4024 binary ripple counter device available in integrated circuit form and having a clock input, an overriding asynchronous master rest input (RST) and seven fully buffered parallel outputs to provide a selected degree of frequency division depending upon which of the outputs is selected. A line 126 connects the highest order stage of the counter to the Timing In terminal of the RAM 122.

With reference again to the CPU chip 118, it can be seen that a resistor 127 and a capacitor 128 are connected between a source of reference potential and ground and has its common junction connected to the master reset terminal of the micro-processor. Upon initial power-up of the system, this R/C network comprised of resistor 127 and capacitor 128 maintains a low signal on the RESET IN terminal for a predetermined time and during this time period, the system clock is disabled and the RESET OUT signal on line 129 in the control cable 121 goes high to generate a reset for initializing the various counters, registers, memories, etc. employed in the system. After a predetermined time, the charge on the capacitor 128 builds up to the point where the RESET IN terminal of the CPU 118 goes high and the micro-processor system is initialized to begin executing a sequence of instructions beginning at a predetermined memory address in the EPROM 119.

One of the first functions performed by the stored software is to cause initialization of the system modes. Typically, the directions of individual bytes within each of the I/O ports on the RAM 122 are established. The port is associated with the graphics processor yet to be described, indicated generally by numeral 130, and is initialized to operate in the "graphics mode".

The video processor, identified by numeral 131, is itself an integrated circuit chip and preferably comprises a Type 68047P raster graphics controller chip manufactured and sold by the American Microsystems Corporation. Associated with the video processor chip 131 is a high speed static memory 132 comprising a plurality of interconnected integrated circuits. The video or graphics memory 132 may comprise twelve Type 2114 integrated circuits connected in cascade. As such, each chip consists of a 1 K×4-byte organization.

By grouping them in pairs, then, the 12 chips are adequate to store 6,144 8-bit bytes of data.

Associated with the video memory 132 is a memory selector chip 133. In the preferred embodiment, it may comprise a Type 74LS138 decoder/demultiplexer manufactured and sold by National Semiconductor, Inc. This circuit is especially designed to be used for memory decoding applications wherein low propagation delay times are needed. It functions to decode one-of-eight lines based upon the conditions at three binary select inputs and three enable inputs. In the figure, the select inputs are labeled A0, A1 and A2 while the enable inputs are labeled E1, E2 and E3. By noting the inputs to the select terminals of the chip 133 it can be seen that A0 and A1 come from the output of the raster graphics controller chip 131 and the third select input to the memory selector 133 comes from a control flip-flop 134, preferably an edge-triggered D-type flip-flop.

In operation, the video memory 132 comprised of the six pairs of individual memory chips is continuously scanned by the video processor 131 and the individual bytes read out from the memory represent light or dark blocks on the CRT display screen. The logic for rastering these signals and presenting them properly is accomplished by the raster graphics controller chip 131. The video output is obtained at the terminal labeled 135. Because this output is typically a TTL level and whereas the signal must be transmitted over a suitable transmission line, a pair of transistors 136 and 137, connected in the Darlington configuration, is used for conditioning that signal to the transmission line.

The video processor chip 131 generates all of the video control logic internally and the only external adjustment provided is by way of the width trimming adjustment afforded by the potentiometer 138 and the capacitor 139 coupled to the control terminal indicated. Those wishing to obtain further information on the internal construction and functioning of the graphics controller chip 131 may wish to refer to American Microsystems Corporation data sheets and application notes relating to this product.

The clock for the video logic is derived from a further crystal 140 which is arranged to control and stabilize the frequency of an oscillator indicated generally by numeral 141. In practice, the crystal 140 may have a natural resonant frequency of 3.579545 Mhz. The output from the oscillator 141 is coupled through a NAND gate 142. The other input to this last-mentioned gate comes from the power-up reset line 129 by way of an inverter 143 and, as such, the clock signal is not made available to the graphics controller chip 131 until the system reset cycle has been completed following initial power-up.

In order for the micro-processor system, including the CPU 118 and its associated memories, to modify the contents of the video memory 132, it is required that the processor be able to interrupt the normal video display raster scanning process in order to enter new information into the memory 132. Furthermore, it is preferable that the CPU 118 not become overly engaged in "housekeeping" activities, i.e., overseeing the entry of each new word of data into the video memory. For this reason, the system of the present invention incorporates direct memory access features, commonly referred to as DMA. The DMA capability allows the CPU 118 to surrender control following initialization, to the video processor 131. More specifically, the video processor chip 131 has an input, "memory select" (MS), which is coupled to the CPU 118 by way of a pair of NAND gates 144 and 145. When the MS input is made to go low, all of the video memory address lines VA0 through VA11 and the video memory data lines VD0 through VD7 are tri-stated, i.e., placed in a high impedance state such that a device elsewhere in the system may have access to that memory.

The inputs to the gate 144 from the "Status Function" output terminals of the CPU 118 are combined with bit 16 of the address bit to generate the VIDEO SELECT signal on line 146 causing this signal to be present when the processor attempts to address memory at any address higher than 8,000 hexidecimal.

To prevent interference from the video display system during its normal displaying activities from interrupting the CPU 118 processing activity by way of its memory and related components, certain additional buffering devices are required. Specifically, data bus drivers 147 and 148 provide the requisite buffering for the data lines while the address lines A0 through A7 are buffered by an 8-bit latch and buffer identified by numeral 149. In implementing the present system, a Type 8216 bidirectional bus driver may be used for the devices 147 and 148 while a Type 8212 integrated circuit may be used to implement the latch/buffer circuit 149. It is to be further noted that the address lines emanating from address outputs A8 through A12 of the CPU 118 are buffered by individual gates, indicated generally by numeral 150, which may each comprise a Type CD4503B device. It should be also mentioned at this point that the latch/buffer 149 also provides de-multiplexing which is required for separating the A0 through A7 lines from the standard INTEL 8085 multiplexed bus where address lines 0 through 7 contain both address and data information at various times in the processor's cycle. This de-multiplexing is accomplished through the use of the address line enable function from the CPU 118 on line 151 which is connected to the strobe input of the circuit 149.

The outputs from the buffers 147 and 148 labeled VD0 through VD7 represent bi-directional access to the system data bus of the CPU. They also exist as a tri-state function condition if the CS input to these latter circuits is low. The direction of data flow is determined by the logic signal applied to the Data Input Enable (DIEN) and is governed by the CPU 118 depending upon whether or not in a given memory cycle an attempt is made to read information from the video memory 132 or to write information into that memory from the processor 118. Specifically, the signal in question is made available from the RD output of the CPU 118 on line 152. When this line is at a low logic level, the system is in the read mode and when high, the system is in its write mode.

The latch/buffer 149 and the buffers 150 associated with the lines VA0 through VA12 also provide tri-state buffering. All of these lines, i.e., VD0 and VD7 through VA12, are maintained in the tri-state condition by the VIDEO SELECT on line 146 except during the CPU cycle when the processor wishes to read from or write into the memory 132. During the VIDEO SELECT cycle, however, the CPU 118 may read or write into the video memory 131 as though it were a portion of the processor's own memory 122, without regard for the fact that the same video memory may be in use by the video processor 131 at the very same instant in time. In operation, the periodic interruptions appear on the CRT screen as short, black lines interlaced with display information for short periods of time.

The input signals from the keyboard operated switches, such as switch 112 in FIG. 12, are applied as inputs to the keyboard interface logic identified generally by 153. This logic consists of a plurality of individual tri-state buffer IC's 154 through 161; these buffers may be typed MC14503B non-inverting buffer devices having three-state outputs and a high current source and sink capability. As such, the device is useful in conjunction with common busing applications. Two disable controls are provided and a high level on the pin 1 input causes the outputs of the buffers 1 through 4 to go into a high impedance state, while a high level on input pin 15 causes the outputs of buffers 5 and 6 to go into a high impedance state. These buffers 154 through 161 comprising the keyboard interface 153 are enabled in groups of 8, beginning with low C on the keyboard and progressing up in groups of 8 through high C. There are, therefore, 49 keys on the piano which provide inputs into this interface logic in six groups of 8 and a seventh group of 1, consisting only of high C. This last mentioned buffer is identified by 162 in FIG. 13d.

The individual groups are selected by a decoder chip 163 which has its outputs interconnected in a predetermined manner to the "Disable" control inputs of the buffers. The decoder may be a type 74LS42 device and, as such, receives a 4-bit input from an output port of the EPROM 119. Thus, depending upon the binary code pattern applied to these four input lines, one of the eight output lines from the decoder chip 163 will be low so as to enable those buffers 154 through 162 to which that particular selected line is connected.

With continued attention to the keyboard interface buffers 153, the outputs of the individual buffer circuits 154 through 162 are connected as inputs to the input port 164 of the RAM 122. The individual lines comprising the bus connection between the keyboard interface 153 and the RAM input port 164 have been eliminated from the drawing so as not to obscure the remainder of the drawings.

Figure 13A:
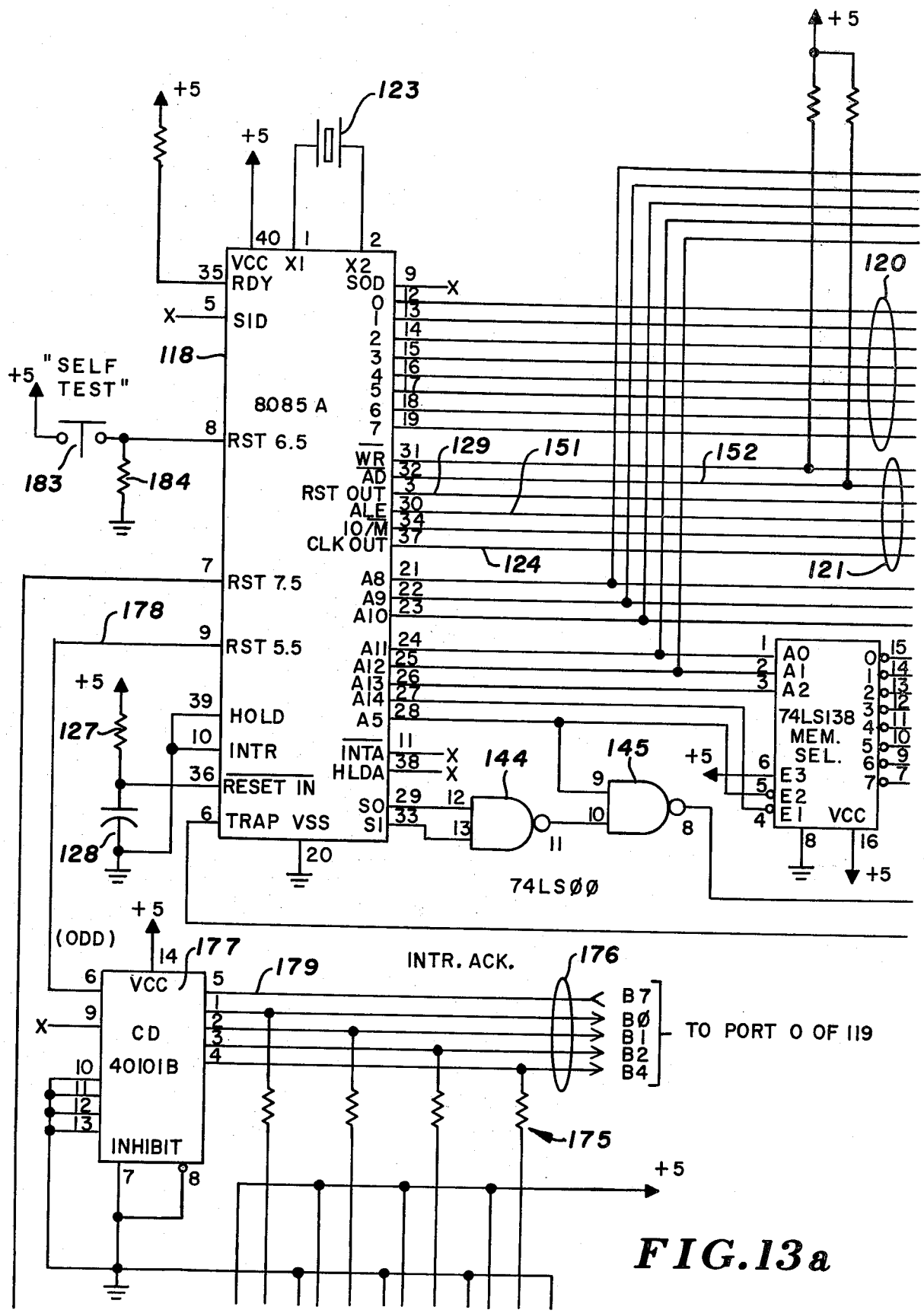
FIG. 13 is the arrangement of the drawings of FIGS. 13a–13h showing a schematic block diagram of the micro-processor based control logic to effect control of the video display unit.
Figure 13B:
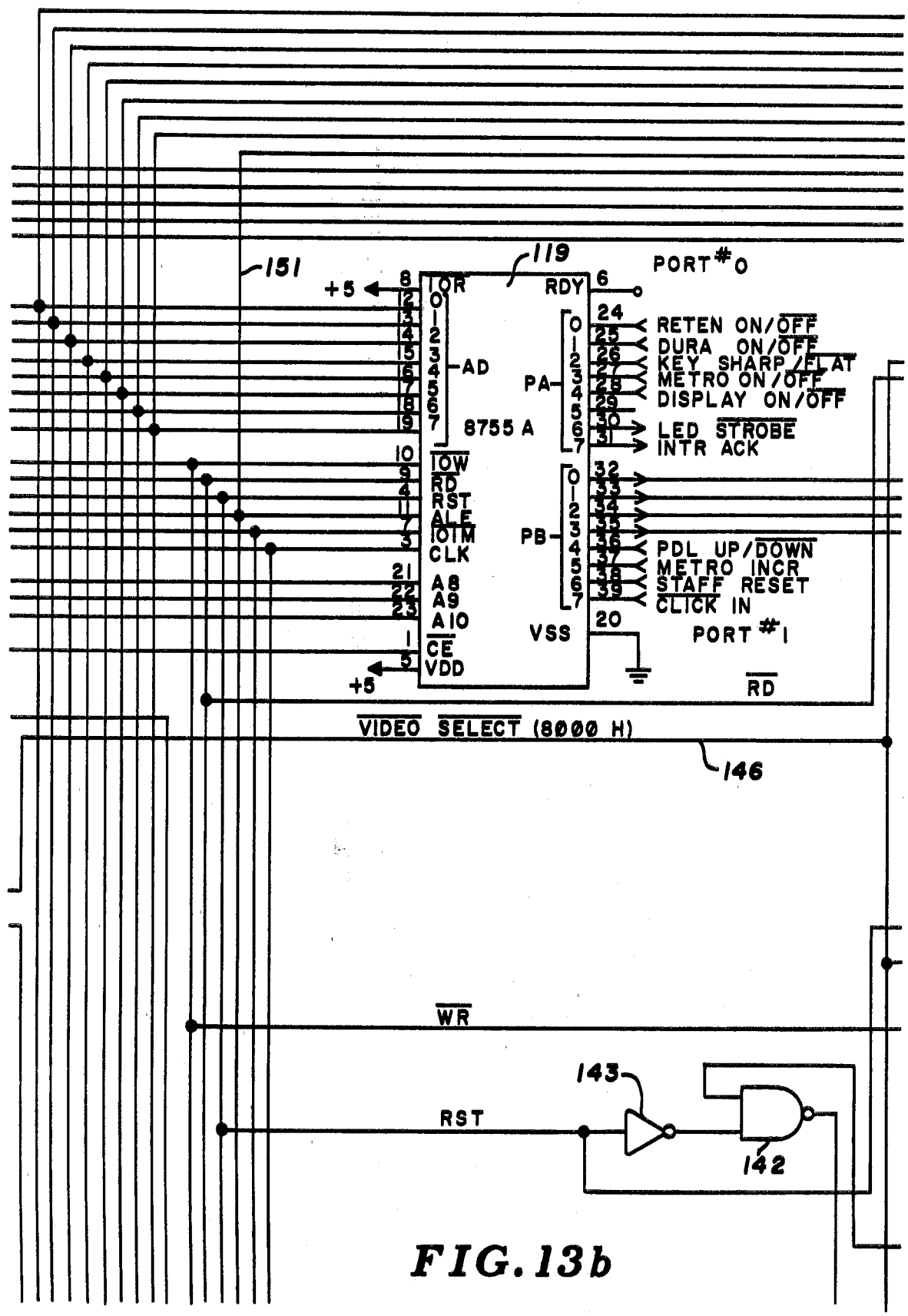
Figure 13C:
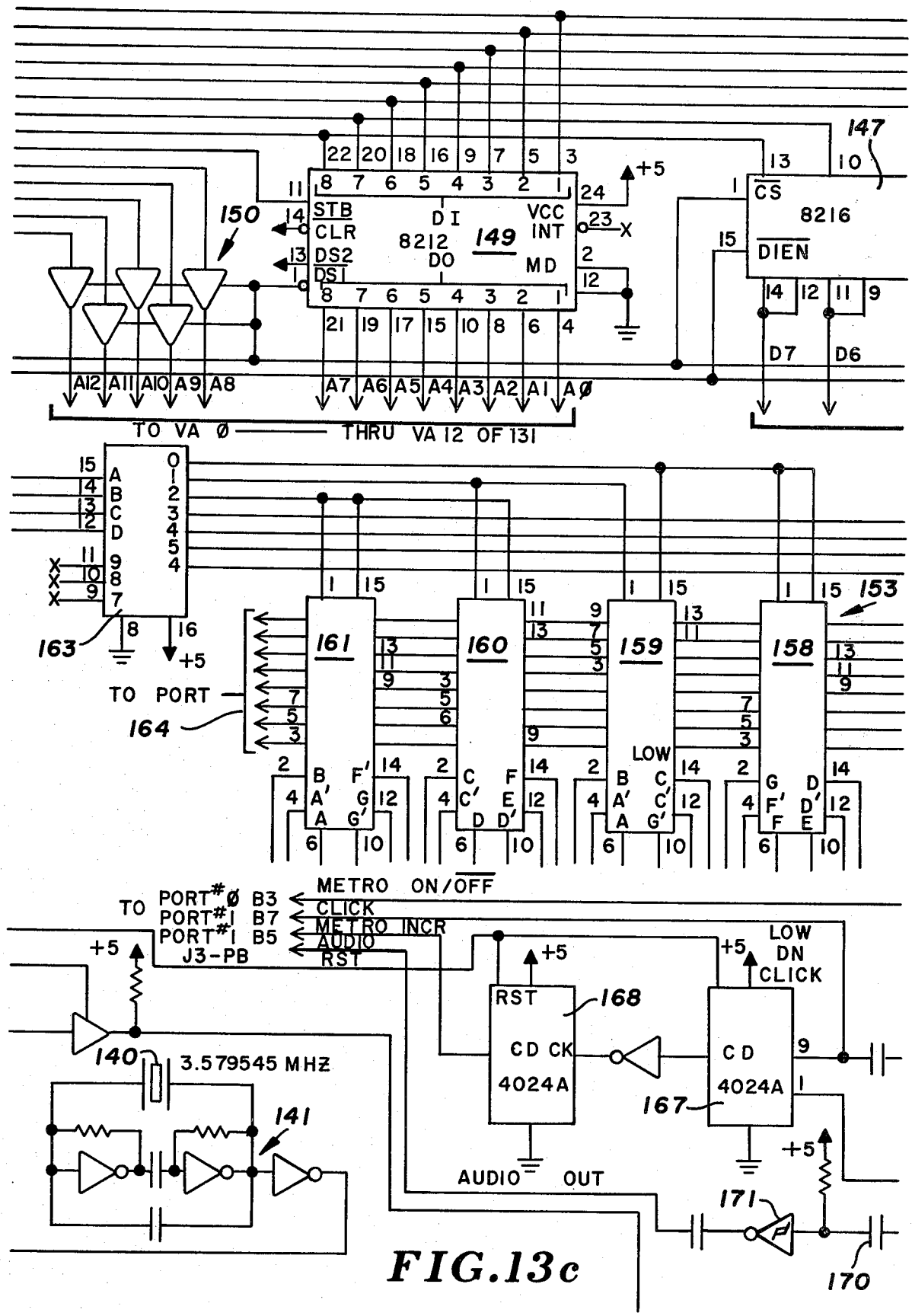
Figure 13D:
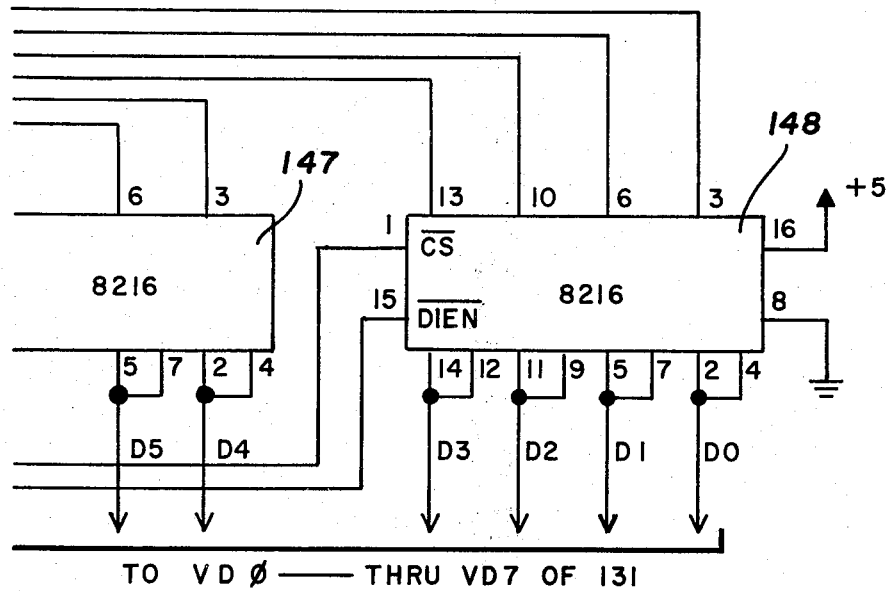
Figure 13D:
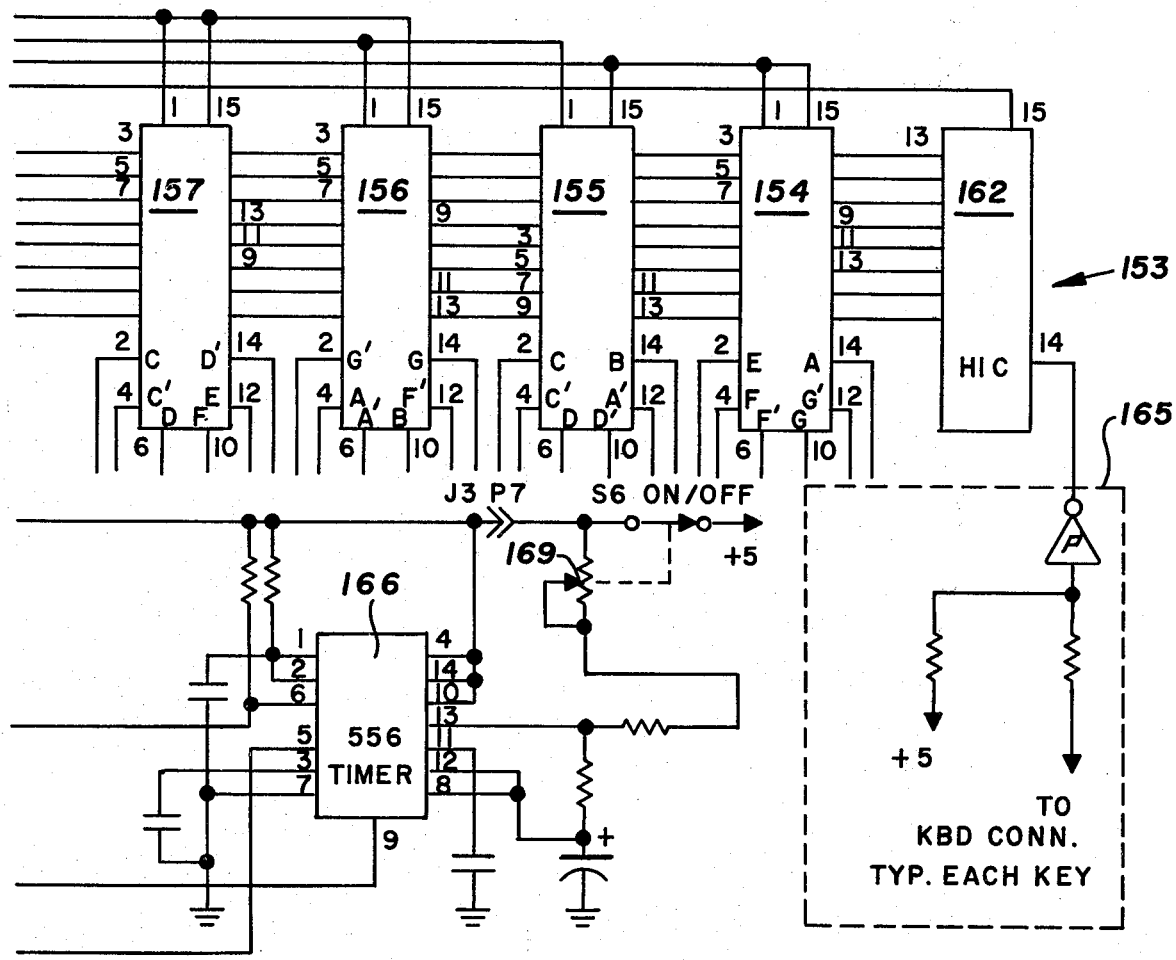

In operation, a sequential count is read out from the EPROM by the micro-processor CPU 118 to the decoder 163 to thereby select individual groups of eight keys based on the interconnection of the keyboard interface buffers 154 through 162. The CPU then reads data from the keyboard interface buffers 153 into the input port 164 of the processor's RAM 122 during each keyboard actuation to determine if any keys within the group are depressed at the sampling time. This cycling continues until the presence of a depressed key is detected. At this point, then, the software associated with the microprocessor system branches such that the display of the depressed key is achieved. It is to be understood that this process occurs very rapidly and would be prone to ghost key selection unless the key depression logic is clean and free of switch contact bounce. To assure that this condition will prevail, a plurality of Schmidtt trigger circuits and associated resistor networks are provided to achieve debounce of the input key depressions and to provide clean, noise-free information to the standing logic. In FIG. 13d, a dash line box 164 surrounds the Schmidtt trigger and associated resistor for the high C key associated with the buffer 162. It is to be understood, however, that similar Schmidtt trigger circuits and associated resistors of the type shown enclosed by the dash line box 165 are provided for each of the input lines to the remaining buffers 154 through 161. Again, to avoid unnecessary confusion in the drawings only one such key switch debounce circuit is illustrated.

The metronome feature previously mentioned is accomplished through the use of the interconnected IC devices 166, 167 and 168. More specifically, IC circuit 166 may comprise a well-known Type 556 timer whose frequency may be adjusted by a potentiometer 169. The device 166 is a dual timer element and the second half of this circuit acts as a monostable multivibrator or one-shot to creat the signal whereby an audible clock will be produced at rates determined by the setting of the potentiometer 169. The one-shot output is passed through a coupling capacitor to a further Schmidtt trigger device 171 to provide a degree of sharpening of the metronome impulse prior to its delivery to the audio-amplification network.

The circuits 167 and 168 are ripple counters which are provided to create an anticipated metronome increment signal to advance the CRT display status with "anticipation" for the beat allowed for. The actual metronome beat is $\frac{1}{8}$ of the clock frequency provided by the type 556 timer 166 and is frequency divided by the circuit 167 with the output therefrom becoming available on the line 172. This $\frac{1}{8}$ clock frequency is then fed back into the second half of the dual timer 166, i.e., to the one-shot frequency circuitry, where it is prepared for audio use. The anticipation lead provided by this logic is $\frac{1}{8}$ of the audible metronome frequency rate and will remain $\frac{1}{8}$ of that frequency regardless of the actual changes in the beat frequency itself.

The on/off status of the metronome logic can be sensed on line 173 which is coupled into port 0 of the EPROM 119 as indicated by the legend on the line 173 and the corresponding legend on the input pin of port 1 of the EPROM 119. Thus, the on/off status of the metronome is made available and, along with other metronome signals, is tested by the system software. The status of the metronome signals thus determines individual programs execution steps which are to take place.

Referring next to FIG. 13e, there is illustrated a plurality of single pole, double throw switches indicated generally by 174, individually labeled S1, S2, S3, and S4. These are operator panel control switches for controlling "retention", "duration", "key", "display", and "staff reset". In that these switches are coupled through resistors indicated generally by 175 to the lines 176 leading to port 0 of the EPROM 119, these switches also may be tested by the software through individual control ports and operating variations will proceed based upon the binary significance of the signals applied through the manually operable control switches. In that all input switches present a potential hazard to the processor 118 in that they may produce static electricity to that circuitry, protection against such hazard is afforded by the resistors 175.

To determine if a recent change has taken place in the position of any of the switches S1 through S4 in the switch bank 174, their inputs are coupled to a 9-bit parity generator/checker circuit 177, particularly a type CD40101B which is available through the RCA Corporation. This circuitry is not used in its conventional mode, but is arranged to generate output data on line 178 which is coupled to the "Restart 5.5" input of the CPU chip 118. This pin tested by the system's software to determine whether a change has taken place since a previous "acknowledge". If such a change has occurred, an "interrupt acknowledge" will be generated on output line 179 which connects to the interrupt acknowledge line of port 0 of the EPROM 119 and the individual switch change will be noted in the software.

Figure 13F:
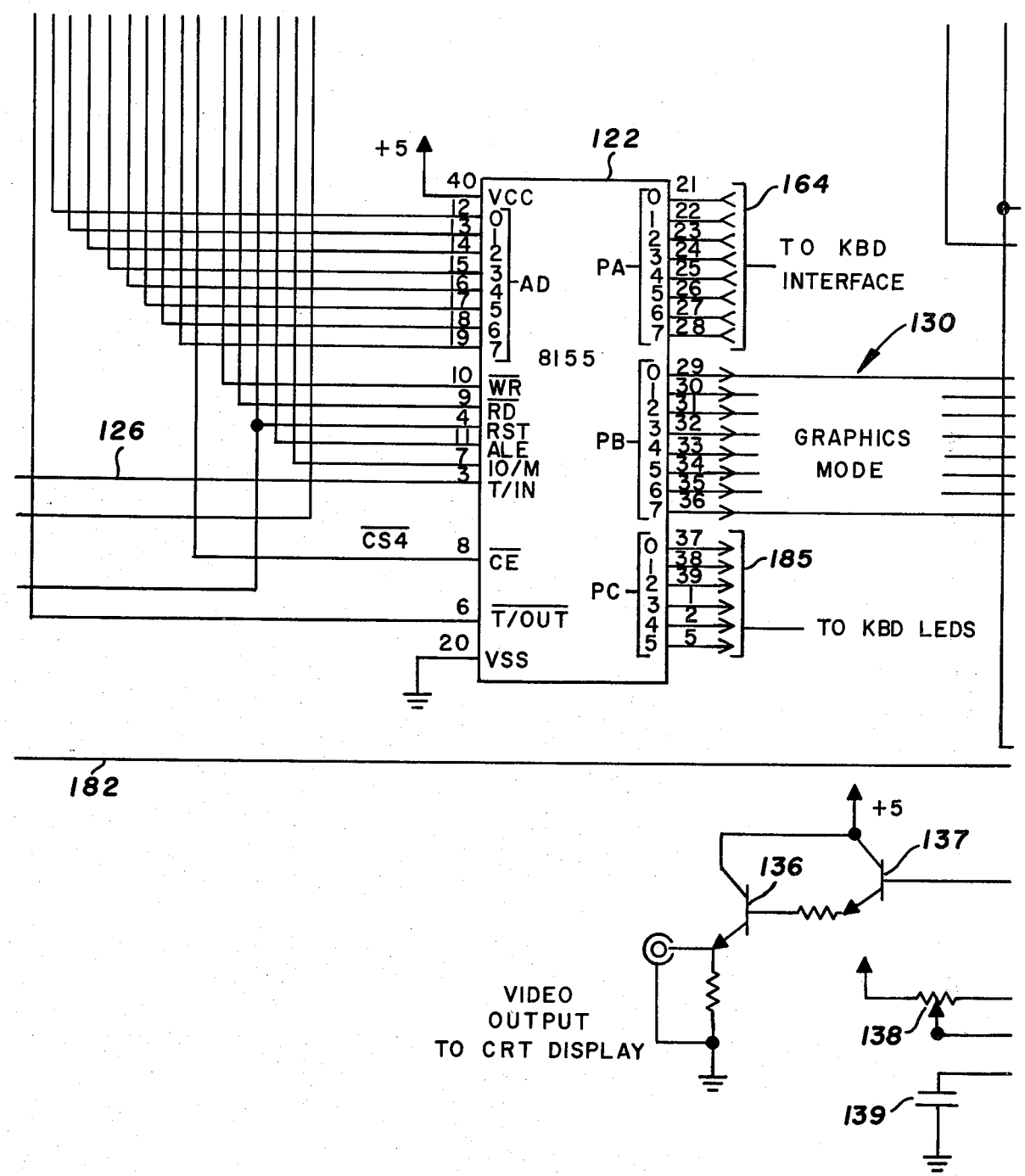
Figure 13G:
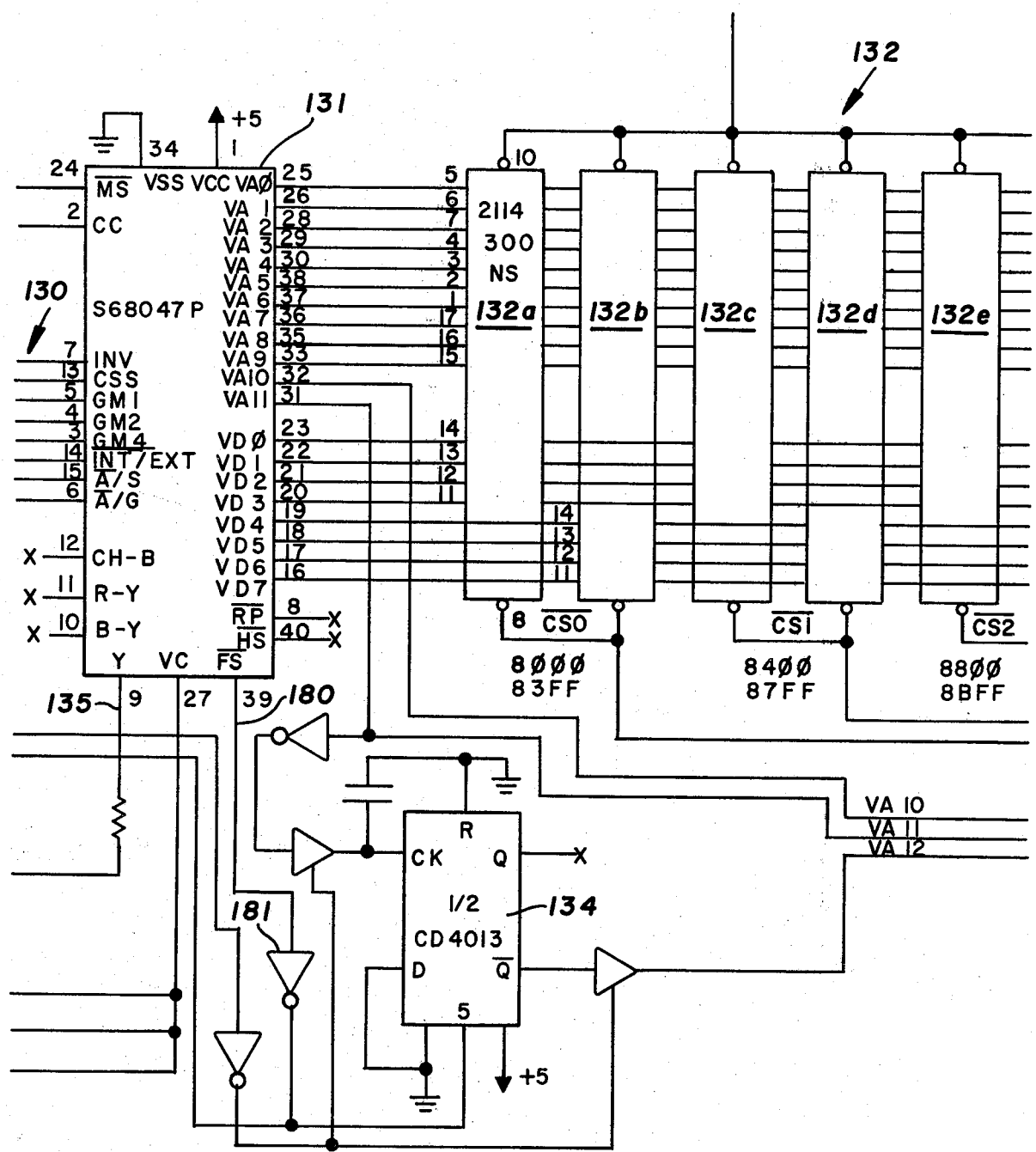
Figure 13H:
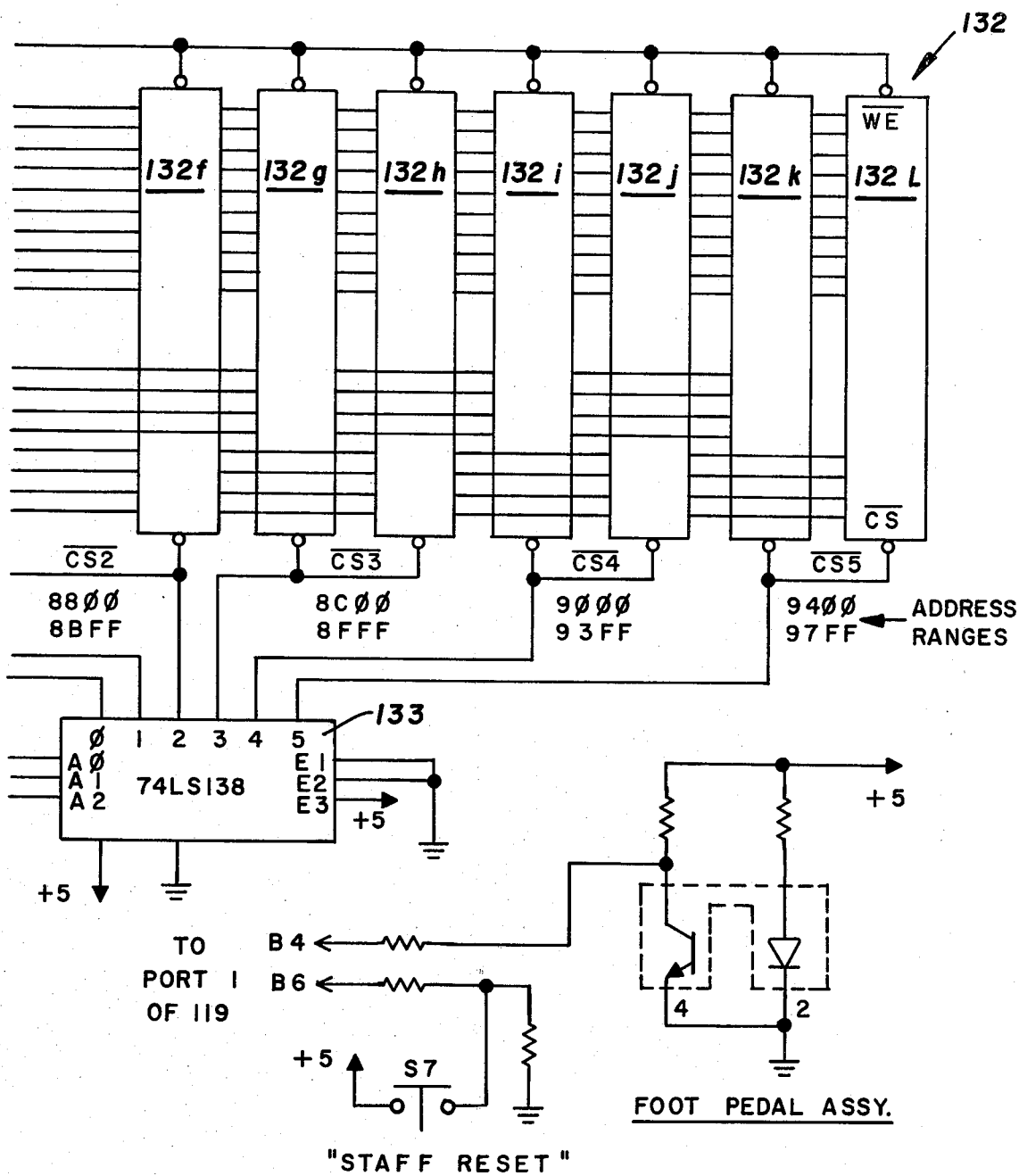

Referring to FIG. 13g now it can be seen that the video processor chip 131 has an output line 180 which couples through an inverter 181 to the "set" terminal of the flip-flop 134 and via a line 182 to the "Restart 7.5" terminal of the CPU 118. The signal on line 182 is conveniently referred to as the "Field Synchronization" output which goes low during the vertical blanking time interval of the CRT. This low signal is inverted by the circuit 181 and is used to generate the video address input to the memory select circuit 133. It is thus possible to arrange the system's software so that the video memory 132 can have data written into it only during the time when the Field Synchronization output is low, thereby eliminating any interference marks which would otherwise appear on the CRT display during the video write operation.

In order to activate certain system diagnostic routines, a push button switch labeled "self-test" and identified by 183 is coupled between a source of positive potential and the "Restart 6.5" input of the CPU. This input is normally held low by the grounded resistor 184, but when the switch 183 is closed, the normal program undergoing execution by the CPU will be interrupted and a branch to the diagnostic routine will be generated. This diagnostic routine is then executed in its normal sequence by repeated closures of the "self-test switch 183". To return control to the normal system's software, it is necessary to first power down and subsequently repower the electronics to initiate the system and again begin execution of the normal display programming.

Figure 14:
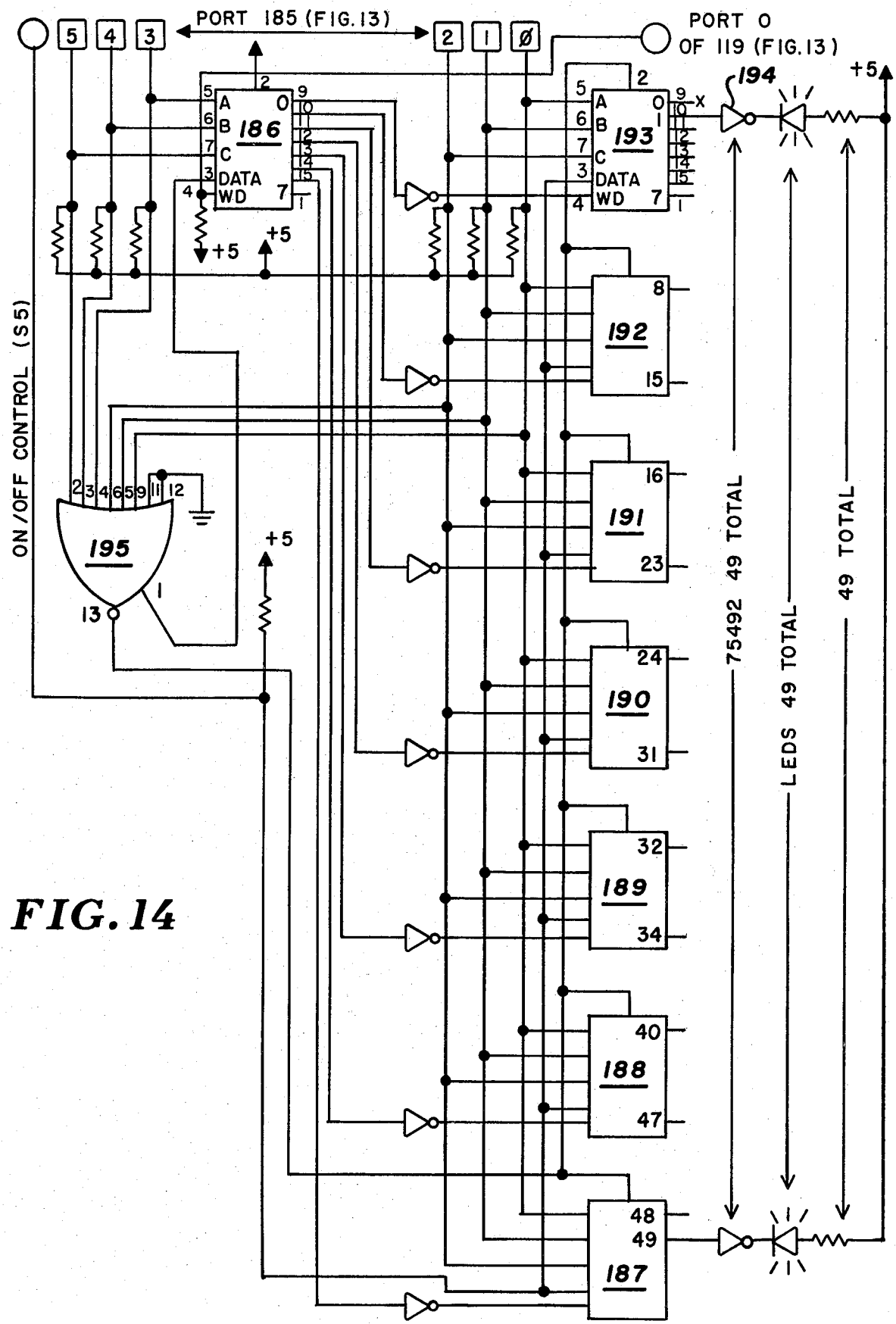
FIG. 14 is a logical block diagram of the keyboard LED display.

Referring to FIG. 14, there is depicted by means of a logical block diagram, the implementation of the keyboard LED display. Its construction will first be set forth and, following that, an explanation will be given as to how the micro-processor base controller circuit of FIG. 13 controls the overall operation thereof. Suffice it to say for now, the output port 185 of the RAM 122 provides a 6-bit binary coded decimal number to the electronics illustrated in FIG. 14. The BCD input is applied to the terminals labeled 0-5 via the system cabling and the number is decoded by a series of 8-bit addressable latches individually identified by numerals 186 through 193, respectively. Each of these devices preferably comprises a Type 4099 integrated circuit which functions as an octal decoder latch.

The resulting latched outputs are applied through inverter amplifiers, such as at 194, and used to drive, individually, a light emitting diode (LED). In FIG. 14, it is to be understood that there are 49 separate inverter amplifiers and LED's individually coupled to the latch outputs from the devices 187 through 193. In implementing the system, the inverter amplifiers may comprise Type 75492 integrated circuits.

A NOR gate 195 is used to detect the presence of a BCD code representative of the digit 0 on the input data lines 0-5 coming from the LED display output 185 in FIG. 13f. If 0 value is detected, the NOR gate 195 will produce a reset pulse which will clear all of the outputs of the octal latches 186 through 193 and extinguish all of the LED indicator lamps. The BCD number required to light one of the keyboard display LED's is first placed on the 6-bit input and allowed to stabilize. When stable, a low pulse labeled "LED strobe" generated by the system's software and that signal is produced at the port 0 output of the EPROM 119 and applied to the "Write Disable" input of the latch 186. The circuit will thus output an enable signal to the appropriate display decoder chip 187 through 193. As such, one output line from these decoders will latch high, thereby causing its corresponding LED to be illuminated. Once any LED indicator is lit, it will remain so until the next BCD 0 condition is detected which, as mentioned, resets all the latches. If the operator desires to disable the keyboard display, he may do so via the switch S4 in the switchbank 174 (FIG. 13e) on the operator's control panel.

While the preferred embodiments of the music note display and programmed controls associating the display with an electronic piano have been shown and described, it is understood that changes, substitutions, and modifications of the structures and control circuits may be made by one skilled in the art without departing from the invention. The invention is defined in the following claims.

The embodiments of the invention in which an exclusive property or privilege is claimed are defined as follows:

1. An apparatus for simultaneously producing audio and visual information of keyboard music comprising: an electronic piano having a keyboard with a plurality of keys adapted to be depressed, an electronic circuit means operatively connected to said keys for generating sounds corresponding to the keys that are depressed, display means including a CRT device having a viewing screen for visually displaying music staff, notes, and notes associated with the staff, signal processor means operatively connected to the electronic circuit means of the piano for controlling the CRT device in a manner so that when a key is depressed a representation of the note corresponding to the depressed key is visually displayed on said screen in association with the staff, said processor means including an information processor programmed to receive signals when one or more of the keys are depressed and transmit control signals to the CRT device so that notes are displayed on the screen in association with the staff at the same time that the key is depressed and the sound of each note corresponding to the depressed key is generated.

2. The apparatus of claim 1 wherein: said information processor is programmed to automatically clear the screen after a predetermined number of notes have been displayed on said screen.

3. The apparatus of claim 2 including: control means connected to the processor operable when on to change the program so that the notes displayed on the screen will remain thereon until the control means is turned off.

4. The apparatus of claim 1 including: control means connected to the processor operable when on to change the program so that the notes displayed on the screen are elongated proportional to the duration that the key is depressed.

5. The apparatus of claim 1 including: metronome means operable to provide rhythm increments to the notes displayed on the screen, said metronome means having adjustable means to alter the metronome beat, said processor means cooperating with the metronome means to provide a moving visual mark on said screen representing the metronome beat.

6. The apparatus of claim 1 including: manually operated means cooperating with said processor for providing when actuated additional spacing between notes displayed on the screen.

7. The apparatus of claim 1 including: control means cooperating with said processor to change the operation thereof so that either flat or sharp modes for each of the keys are visually displayed on the screen.

8. The apparatus of claim 1 including: first control means connected to the processor operable to change the program so that the notes displayed on the screen will remain thereon until the first control means is turned off, second control means connected to the processor operable to change the program so that the notes displayed on the screen are elongated proportional to the duration that the key is depressed, and third control means connected to the processor operable to change the program so that either flat or sharp modes for each of the keys are visually displayed on the screen.

9. The apparatus of claim 8 including: metronome means cooperating with said processor to provide rhythm increments for the notes displayed on the screen, said metronome means having adjustable means to alter the metronome beat.

10. The apparatus of claim 9 wherein: said processor includes means responsive to the operation of the metronome means to provide a visual mark on the screen that moves with the beat of the metronome means across the screen.

11. The apparatus of claim 1 wherein: said display means includes a second visual display showing the keys of the keyboard.

12. The apparatus of claim 11 wherein: said second visual display comprises a keyboard representation located adjacent said screen, and light means associated with each of the keys of the keyboard representation, said light means of each key being turned on when the corresponding key of the piano keyboard is depressed.

13. The apparatus of claim 1 including: a frame, means movably mounting the frame on the piano, means connecting the frame to said display means, and means to support at least a portion of said frame on a supporting surface.

14. The apparatus of claim 13 wherein: said means connecting said frame to said display means including a pivot assembly allowing the display means to rotate about a generally upright axis, said pivot assembly having motion limiting means for limiting the amount of rotation of said display means.

15. The apparatus of claim 14 wherein: said means connecting said frame to said display means includes an upright post having an upright passage, said motion limiting means including a member extended into said passage, and first and second coacting means on the post and member to limit the amount of rotation of the display means.

16. The apparatus of claim 1 including: a frame, means movably mounting the frame on said housing, means connecting said frame to said display means to locate said display means adjacent said piano, and means to support at least a portion of said frame on a supporting surface.

17. The apparatus of claim 16 wherein: said means connecting said frame to said display means including a pivot assembly allowing the music note display means to rotate about a generally upright axis, said pivot assembly having motion limiting means for limiting the amount of rotation of said display means.

18. The apparatus of claim 17 wherein: said motion limiting means has first and second coacting means operable to limit the amount of rotation of the display means.

19. The apparatus of claim 16 wherein: said means connecting said frame to said display means includes an upright post having an upright passage, said motion limiting means including a member extended into said passage, and first and second coacting means on the post and member to limit the amount of rotation of the display means.

20. The apparatus of claim 18 wherein: said first means includes a lip on said member, said lip having spaced stop edges, said second means includes a fixed member secured to said post, said stop edges being selectively engageable with the fixed member to limit rotation of the first means to less than 360 degrees thereby limiting the rotation of said display means.

21. The apparatus of claim 17 wherein: said means connecting said frame to said display means includes a generally U-shaped yoke secured to said pivot assembly, and means mounting the display means on said yoke.

22. The apparatus of claim 21 wherein: the means mounting the display means on said yoke includes pivot means allowing the display means to be moved about a generally horizontal axis, and releasable holding means cooperating with said pivot means for holding the display means in a selected position.

23. The apparatus of claim 16 including: lock means attachable to a piano for holding the frame in a fixed position relative to the piano, said lock means being releasable allowing the frame means to pivot relative to said piano.

24. The apparatus of claim 16 wherein: said means to support at least a portion of said frame on a supporting surface includes rotatable wheel means engageable with the supporting surface.

25. An apparatus for simultaneously producing audio and visual information of keyboard music comprising: an electronic piano having a keyboard with a plurality of keys adapted to be depressed, and means operatively connected to the keys for generating sounds corresponding to keys that are depressed, display means for visually displaying notes, said display means including a first visual display showing music notations relative to a staff corresponding to keys that are depressed and a second visual display showing the keyboard and the keys that are depressed, said first visual display including a CRT device having a screen for displaying the staff and musical notation, said second visual display comprising a keyboard representation located adjacent said screen and light means associated with each key of the keyboard representation, said light means of each key being turned on when the corresponding key of the piano keyboard is depressed, electric signal processor means operatively connecting the electronic piano with the CRT device so that when a key is depressed a representation of the note corresponding to the depressed key is visually displayed on the screen of the CRT device in association with the staff display on the screen whereby the sound and visual display of each note are simultaneously produced when one or more keys are depressed, and metronome means cooperating with said electric signal processor means to provide rhythm increments to the notes displayed on the screen of the CRT device, said metronome means having adjustable means to alter the metronome beat.

26. The apparatus of claim 25 including: control means connected to the processor means operable to change the program of the processor means so that either flat or sharp modes for each of the keys are visually displayed on the screen of the CRT device.

27. The apparatus of claim 25 including: control means having an on-off switch means connected to the processor means operable when the switch means is on to change the program of the processor means so that the music notation will be visually retained on the screen of the CRT device until the switch means is turned off.

28. The apparatus of claim 25 wherein: said processor means includes means responsive to the operation of the metronome means to provide a visual mark on the screen of the CRT device that moves with the beat of the metronome means horizontally across the screen of the CRT device.

29. The apparatus of claim 25 including: control means cooperating with the processor means to display notes on the screen in a manner representing the duration that the keys are depressed.

30. The apparatus of claim 25 including: manually operated means cooperating with said processor means for providing when actuated additional spacing between notes displayed on said screen.

31. The apparatus of claim 25 including: frame means supporting the display means adjacent the piano, and means pivotally mounting the frame means on the piano allowing the frame means and display means to be moved relative to the piano.

32. The apparatus of claim 31 wherein: said frame means includes means to pivotally support the display means about a generally upright axis, and motion limiting means for limiting the pivotal movement of the display means about said upright axis.

* * * * *

UNITED STATES PATENT AND TRADEMARK OFFICE
CERTIFICATE OF CORRECTION

PATENT NO. : 4,366,741

DATED : January 4, 1983

INVENTOR(S) : John S. Titus

It is certified that error appears in the above-identified patent and that said Letters Patent are hereby corrected as shown below:

Column 6, line 23, "block" should be -- clock --.

Column 9, line 53, "microprocessor" should be
    -- micro-processor --.

Column 9, line 63, "164" should be -- 165 --.

*Signed and Sealed this*

*Twelfth* Day of *July 1983*

[SEAL]

*Attest:*

*Attesting Officer*

GERALD J. MOSSINGHOFF

*Commissioner of Patents and Trademarks*